United States Patent [19]

Ambs et al.

[11] Patent Number: 5,186,312
[45] Date of Patent: Feb. 16, 1993

[54] CONVEYOR FOR BULK MATERIALS

[75] Inventors: Richard W. Ambs, Williamsport; Steven Kelchner, Linden, both of Pa.

[73] Assignee: The Young Industries, Muncy, Pa.

[21] Appl. No.: 695,006

[22] Filed: May 3, 1991

[51] Int. Cl.⁵ .......................................... B65G 19/14
[52] U.S. Cl. .................................. 198/716; 198/733
[58] Field of Search .......... 198/716, 733, 533, 550.11, 198/550.01

[56] References Cited

U.S. PATENT DOCUMENTS

| | | | |
|---|---|---|---|
| 2,680,511 | 6/1954 | Hapman | 198/733 |
| 2,756,866 | 7/1956 | Wilde | 198/716 X |
| 3,889,799 | 6/1975 | Pirovano | 198/716 X |
| 3,993,184 | 11/1976 | Campbell | 198/716 X |
| 4,071,136 | 1/1978 | Jones | 198/718 X |
| 4,195,725 | 4/1980 | Jones | 198/716 X |
| 4,197,938 | 4/1980 | Klinkenberg | 198/716 |
| 4,676,363 | 6/1987 | Buchmuller et al. | 198/533 X |
| 4,741,428 | 5/1988 | Taniguchi et al. | 198/533 X |
| 5,062,741 | 11/1991 | Pirovano | 198/716 X |

Primary Examiner—Joseph E. Valenza
Assistant Examiner—Dean A. Reichard
Attorney, Agent, or Firm—Lalos & Keegan

[57] ABSTRACT

A conveyor for bulk materials comprising first and second housings, a pair of conduits interconnecting the housings to provide a circuitous path, one of the housings and the conduits having means for feeding material therein, one of the housings and the conduits having means for discharging material therefrom, a sprocket mounted in each of the housings, means for driving one of the sprockets, and a rope assembly including a nylon-coated metallic wire rope disposed in the housings and the conduits, along the circuitous path, and reeved around the sprockets, metallic end ferrules press-fit onto and welded to opposing, exposed end portions of the rope, a plurality of intermediate metallic ferrules press-fit onto the nylon coating of the rope at spaced intervals between the end ferrules, and a plurality of disc assemblies mounted on the rope and received within spaced recesses provided on the peripheries of the sprockets, each of the disc assemblies inlcuding a single boss and a single disc mounted on the rope and secured together with a ferrule therebetween.

22 Claims, 8 Drawing Sheets

CONVEYOR FOR BULK MATERIALS

This invention relates to a bulk material conveyor and more particularly to a type of conveyor in which a rope assembly provided with a plurality of spaced disc elements is operated at high speeds to displace both air and the material being conveyed.

In the prior art, there has been developed a type of conveyor for conveying bulk materials such as grains, powders, pellets, chips, granules, flakes and the like, generally consisting of a lower housing assembly usually having a material feeding means, an upper housing assembly usually having a material discharge means and a pair of tubular members interconnecting the housing assemblies to provide a circuitous path, and a rope assembly provided with spaced disc elements and disposed along the circuitous path. The rope assembly is operated at high speeds so that the disc elements displace both air and material usually fed through the lower assembly. The displacement of air along with the material being conveyed has the effect of fluidizing the material thus enhancing the displacement process. An example of such a conveyor is illustrated and described in U.S. Pat. No. 3,993,184.

In the use of such type of conveyors a number of deficiencies in prior art designs have been found. One of the principal drawbacks has been the frequent failure of the rope assembly requiring the removal of the conveyor from surface and the repair, maintenance or replacement of the rope assembly which can be costly in terms of repair or replacement costs and loss of production. Another drawback of such prior art design is its poor performance in conveying fine and super fine materials having poor flow characteristics such as titanium dioxide and the like. Frequently, such materials will cling to interior surfaces of the housing assemblies and accumulate to impede or obstruct the flow of material. It thus has been found to be desirable to provide a bulk material conveyor of the type described which overcomes such deficiencies in comparable prior art conveyors.

Accordingly, it is the principal object of the present invention to provide an improved bulk material conveyor.

Another object of the present invention is to provide an improved conveyor capable of reliably and efficiently transporting materials such as grains, powders, pellets, chips, granules, flakes and the like.

A further object of the present invention is to provide an improved conveyor of the type that utilizes a rope assembly provided with disc elements for displacing both air and material.

A still further object of the present invention is to provide an improved conveyor of the type that utilizes a rope assembly provided with disc elements for displacing both air and material in which an improved rope assembly is provided requiring less repair, maintenance and replacement.

Another object of the present invention is to provide an improved conveyor of the type that utilizes a rope assembly provided with disc elements for displacing both air and material in which volumetric output is enhanced and material damage is minimized.

A further object of the present invention is to provide an improved conveyor of the type that utilizes a rope assembly provided with disc elements for displacing both air and material which is particularly effective in conveying super fine materials.

A still further object of the present invention is to provide an improved conveyor of the type that utilizes a rope assembly provided with disc elements that is driven at high speeds to displace both air and material in which clinging of the material being conveyed is substantially reduced if not eliminated thus enhancing volumetric output without requiring increased horsepower.

Another object of the present invention is to provide an improved conveyor of the type utilizing a rope assembly provided with a plurality of disc elements for displacing both air and material which is simple in design, efficient in performance and readily serviceable.

Other objects and advantages of the present invention will become apparent to those persons having ordinary skill in the art to which the present invention pertains from the following description taken in conjunction with the accompanying drawings in which:

Referring to FIGS. 1 through 6 and 8, there is illustrated a conveyor 30 embodying the present invention which generally includes a base unit 31, a lower housing assembly 32, an upper housing assembly 33, a pair of tubular members 34 and 35 interconnecting the upper and lower housing assemblies to provide a circuitous path, and a continuous rope assembly 36 disposed within housing assemblies 32 and 33 and conduits 34 and 35, along the circuitous path. Base unit 31 functions to support the entire unit and has provided thereon a motor operatively connected to a sprocket in the lower housing assembly to drive the rope assembly at speeds on the order of 720 ft/min. The size of the motor would depend upon the size of the conveyor, the lengths of tubular members 34 and 35 and the type of material to be conveyed.

As best shown in FIGS. 1, 2, 5 and 6, lower housing assembly 32 includes a sprocket housing 37 having a top wall 38, a rounded bottom wall 39, a pair of side walls 41 and 42 and a pair of tubular portions 43 and 44 projecting tangentially relative to bottom wall 39 and provided with clamps 45 and 46 for securing the lower housing assembly to the lower ends of tubular members 34 and 35. Secured to side walls 41 and 42 is a set of annular mounting plates 47 and 48. Detachably mounted on mounting plate 47 is a bearing housing 49 which is adapted to be mounted on the base unit for supporting the unit consisting of the lower and upper housing assemblies and the interconnecting tubular members. Provided in a boss portion 50 of the bearing housing is a set of bearings 51 and 52 in which there is journaled a drive shaft 53. The outer end of shaft 53 extends into the base member and is operatively connected to a drive motor in the conventional manner. The inner end of shaft 53 extends through an opening in side wall 41 and has mounted thereon a drive sprocket 54.

Figure 4:
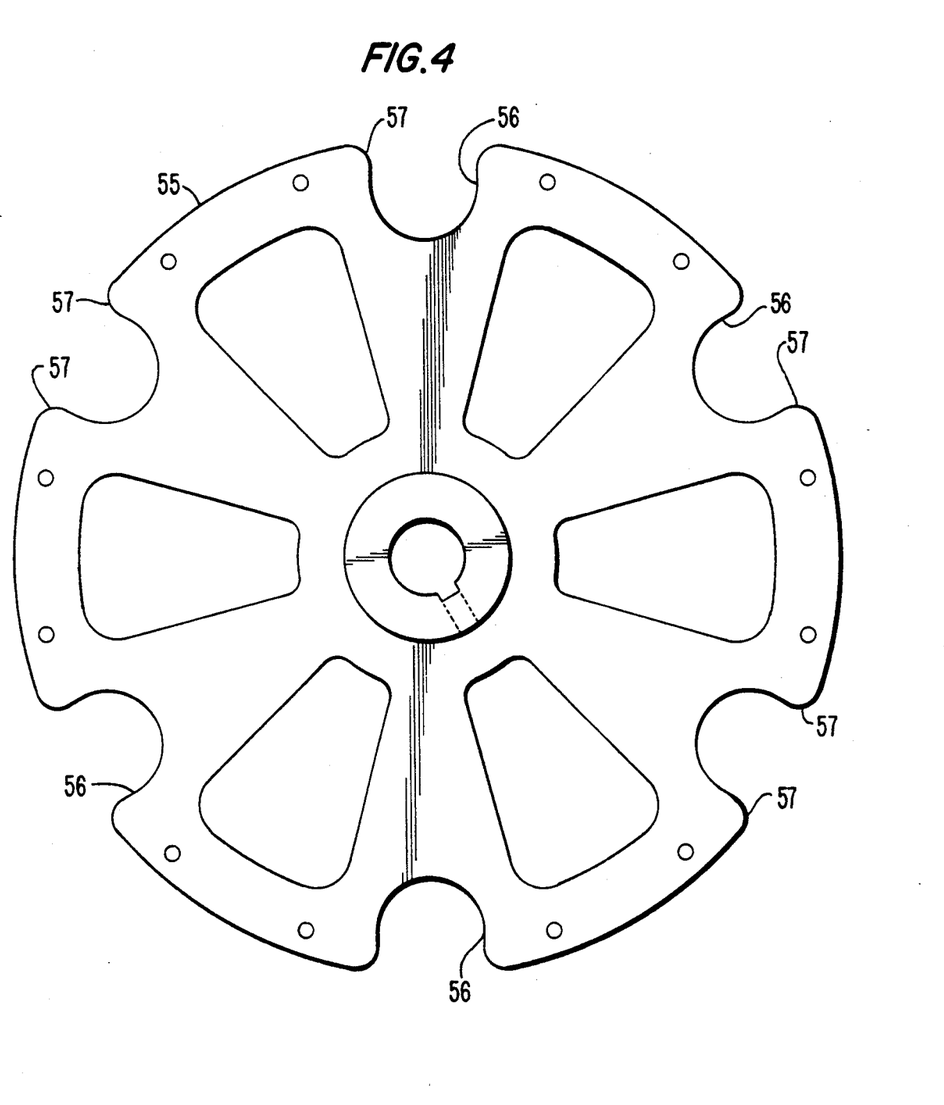
FIG. 4 is a side view of the sprocket provided in the housing assemblies shown in FIGS. 2 and 3.

Referring to FIG. 4, sprocket 54 is provided with an annular end surface 55 having a plurality of circumferentially spaced recesses or sockets 56. Each of the corners defined by the annular end surface and the surfaces of the sockets are rounded as at 57 for purposes as will later be explained. The sides of the sprocket further are provided with sets of brackets 58 and 59, each of which are rigidly secured to the sprocket and span a socket to laterally restrain a disc assembly as later will be described.

Figures 5, 6, 7, 8:
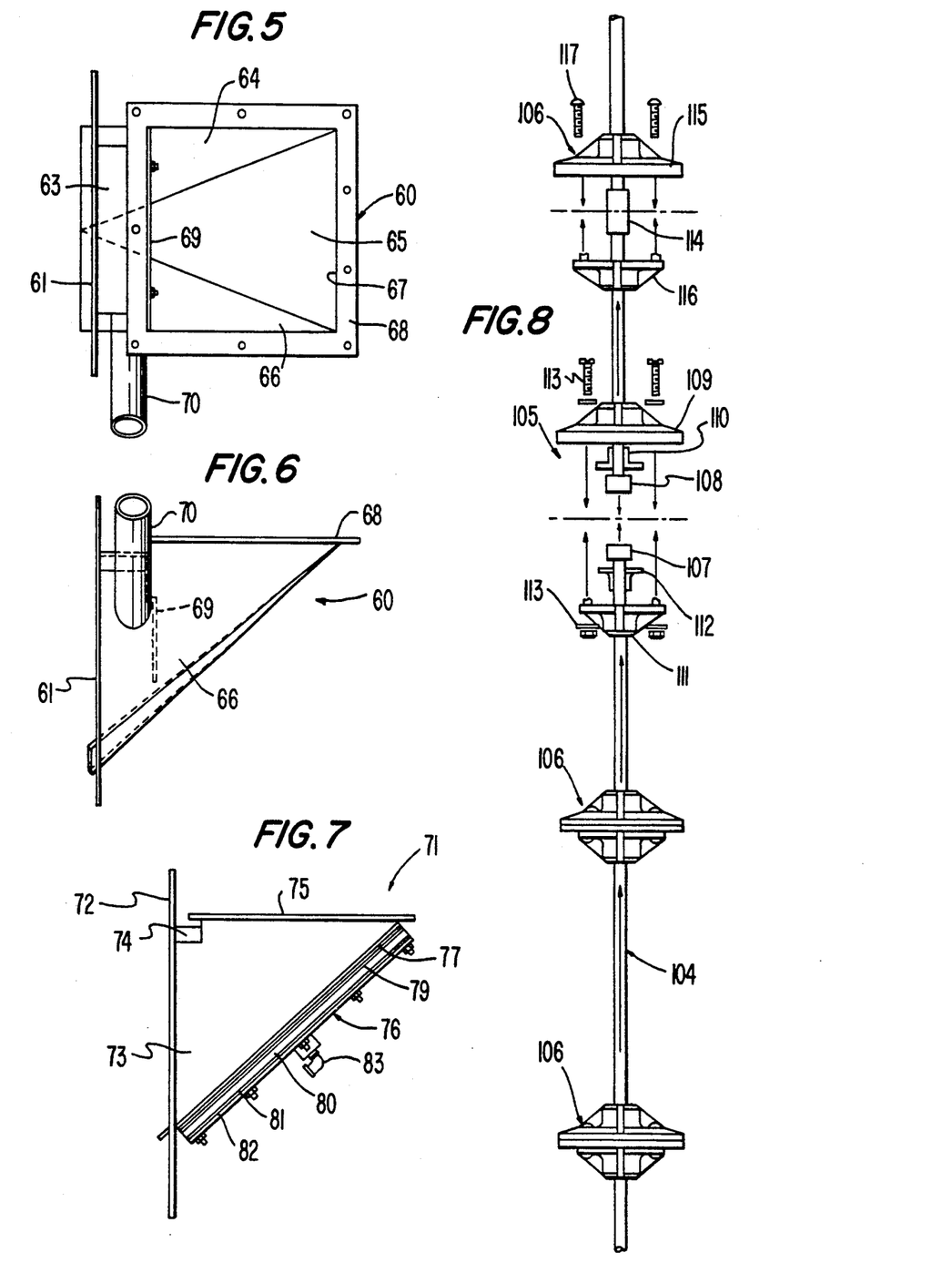
FIG. 5 is an enlarged cross-sectional view taken along line 5—5 in FIG. 1.
FIG. 6 is a side elevational view of the hopper shown in FIG. 5.
FIG. 7 is a side elevational view similar to the view shown in FIG. 6, illustrating a modified hopper which may be utilized with one of the housing assemblies shown in FIG. 1.
FIG. 8 is an enlarged view of a segment of the rope assembly utilized in the embodiment shown in FIGS. 1 through 6, illustrating the components of an end and intermediate disc assemblies in exploded relation.
Figures 9, 10, 11, 12:
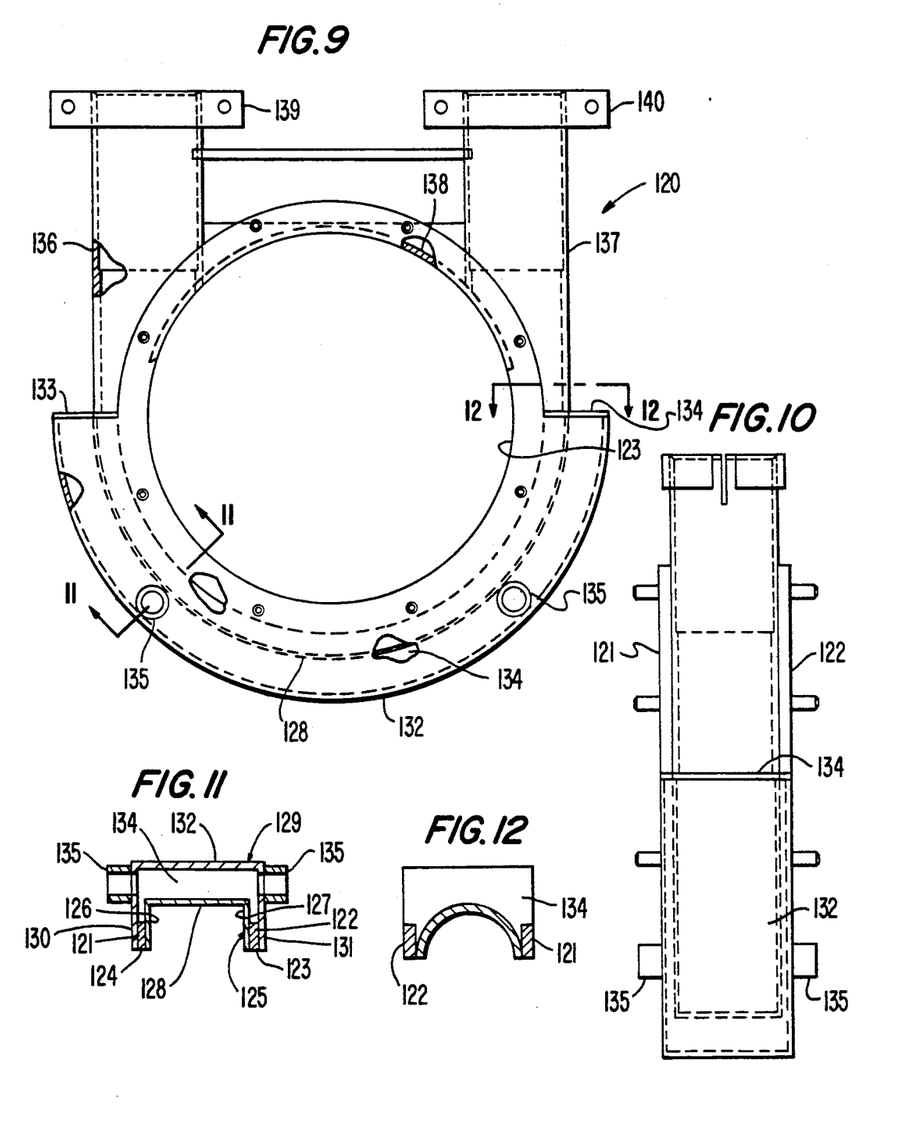
FIG. 9 is an enlarged side view of an alternate lower housing assembly that may be utilized in the conveyor shown in FIG. 1.
FIG. 10 is an end view of the assembly shown in FIG. 9.
FIG. 11 is a cross-sectional view taken along line 11—11 in FIG. 9.
FIG. 12 is a cross-sectional view taken along line 12—12 in FIG. 9.

Referring to FIGS. 5 and 6, there is shown a hopper 60 which is mounted on sprocket housing 37 and communicates with the lower end thereof for gravity feeding a material to be conveyed. The hopper includes a mounting wall 61 mounted on and secured to mounting plate 48 by means of a cover plate 62. The hopper further is formed with a top wall 63, a set of triangular bottom walls 64, 65 and 66 and an upper inlet 67 provided with a mounting flange 68. Depending from the inner side of upper inlet opening 67 is a vertically adjustable baffle plate 69 which may be adjusted vertically to adjust the flow of material through the hopper into the lower end of the sprocket housing. Air trapped in the hopper may be vented through a vent pipe 70 provided in bottom wall 66. It will be appreciated that material to be conveyed, gravity fed into the hopper through upper inlet opening 67, will be caused to slide downwardly along bottom walls 64 through 66 and enter the sprocket housing through an opening in sprocket housing wall 42.

FIG. 7 illustrates an alternate feed hopper 71 particularly adaptable for use in applications where a fine or super fine material is to be conveyed. The hopper includes a mounting plate 72 mountable on mounting plate 48, having an opening communicating with the interior of sprocket housing 37, a pair of side walls 73, 73, a top wall 74 having an inlet opening provided with a peripheral mounting flange 75 and a bottom wall assembly 76. The bottom wall assembly consists of a gas permeable wall member 77 cooperating with side walls 73, 73 to provide a sloped surface for guiding material fed into the hopper, into the sprocket housing, a gasket 79 positioned about the periphery of wall member 77, a spacer 80 engaging gasket 79, a gasket 81 mounted on the spacer and an outer cover plate 82 engaging gasket 81. Outer cover plate 82, spacer 80 and gas permeable wall member 77 cooperate to provide a chamber behind the gas permeable wall member which can be pressurized through a fixture 83 to cause air under pressure to permeate wall member 77 and thus fluidize fine or super fine material fed into the hopper and deposited on wall member 77. Typically, the hopper will be connected to a source of air pressure in the order of about 5 psi by means of fixture 83. Preferably, the gas permeable wall member will be formed of a dense screen laminate manufactured by Michigan Dynamics, Inc. and sold under the trademark DYNAPORE. The DYNAPORE material is a sintered and annealed metallic material produced by precision calendering and high temperature diffusion bonding to achieve precise and uniform air permeability. The material used in the process may consist of austenitic steel alloys such as T-304 and T-316 steel.

Figure 1:
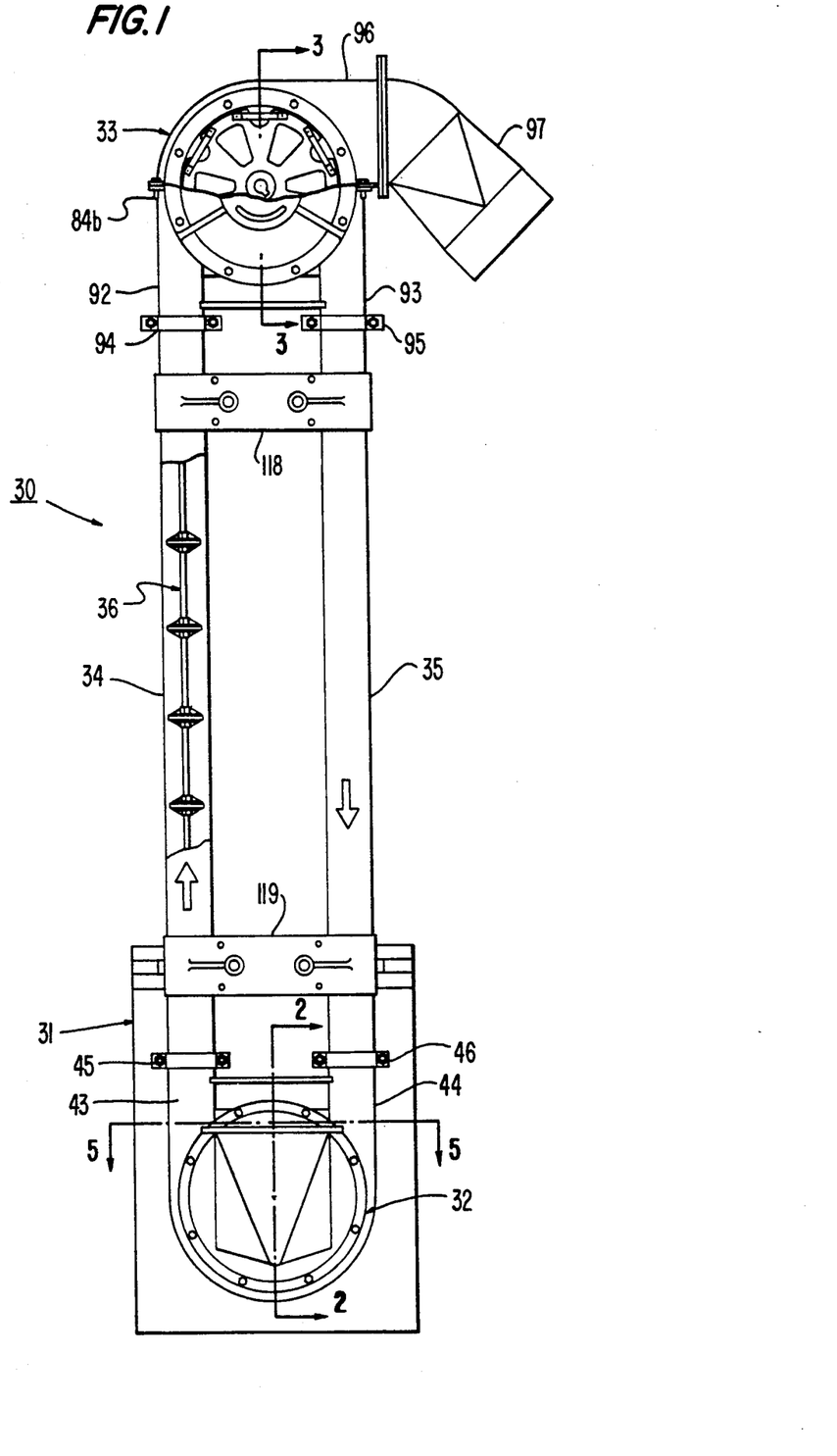
FIG. 1 is a side elevational view of a conveyor embodying the present invention, having portions thereof broken away.
Figure 3:
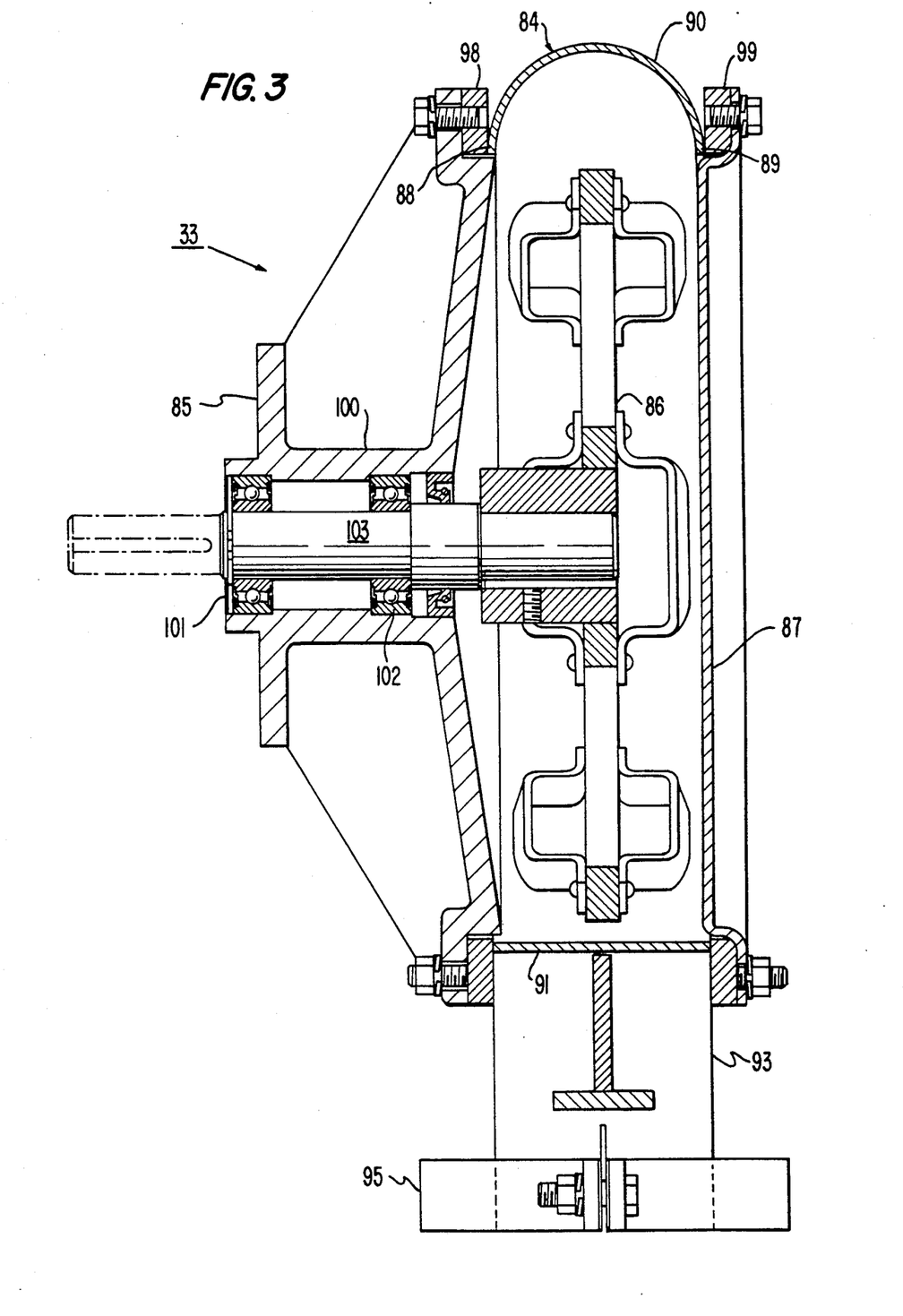
FIG. 3 is an enlarged cross-sectional view taken along line 3—3 in FIG. 1.

Upper housing assembly 33 is similar in construction to the lower housing assembly and generally includes a sprocket housing 84, a bearing housing 85, an idler sprocket 86 and a cover plate 87. As best shown in FIGS. 1 and 3, the sprocket housing includes a pair of side walls 88 and 89, a rounded top wall 90, a bottom wall 91, a pair of depending, tangentially projecting tubular portions 92 and 93 adapted to be secured to the upper ends of tubular members 34 and 35 by means of a set of clamps 94 and 95 and a laterally disposed, tangentially projecting portion 96 having a discharge spout 97 provided on the outer end thereof. Rigidly secured to side walls 88 and 89 is a set of annular mounting plates 98 and 99.

Bearing housing 85 is substantially identical to bearing housing 49 and also includes a boss 100 in which there is mounted a pair of bearings 101 and 102. Journaled in the bearings is a shaft 103 having an inner end thereof projecting within the sprocket housing. Sprocket 86 is substantially identical to sprocket 54 and is mounted on the inner end of shaft 103. The access opening in housing side wall 89 is closed by cover plate 87 detachably secured to mounting plate 99.

The rope assembly is reeved about sprockets 54 and 86 and disposed along the circuitous path provided by the upper and lower housing assemblies and tubular members 34 and 35. As best shown in FIG. 8, the rope assembly consists of a rope 104 which is reeved about sprockets 54 and 86, an end disc assembly 105 which secures opposing ends of the rope together and is adapted to be received within the sockets or recesses in the peripheries of the sprockets and a plurality of intermediate disc assemblies 106 spaced along the rope and also adapted to be received within the sockets or recesses in the peripheries of the sprockets. Rope 104 consists of a nylon-coated steel wire rope having the opposed end portions stripped bare of the nylon coating. Press-fit onto and welded to the exposed ends of the wire rope is a pair of metallic end ferrules 107 and 108. End disc assembly 105 consists of a disc element 109 mounted on the rope and engaging the leading side of ferrule 108 through a rope end fitting 110, a boss 111 mounted on the rope and engaging with the trailing side of end ferrule 107 through a rope end fitting 112, and a set of threaded fasteners 113 for securing disc element 109 and boss 111 together with end ferrules 107 and 108 engaging each other and being rigidly secured therebetween.

Press-fit onto the nylon-coated steel wire rope is a set of metallic, intermediate ferrules 114. Each intermediate disc assembly consists of a disc element 115 and a boss 116 mounted on the rope and secured together with a ferrule 114 therebetween by a set of rivets 117. Each of disc elements 115 is disposed on the leading side of a ferrule 114 and the associated boss is disposed on the trailing side thereof.

Preferably, each of disc elements 109 and 115 is formed of nylon and each of bosses 111 and 116 is formed of polyurethane. However, either of such components may be formed of nylon, polyurethane, polycarbonate or combinations thereof. The nylon coating of the rope serves to prevent fraying of the rope as it engages and passes about the peripheries of the sprockets at high speeds. The rounding of the corners of the sprockets formed by the peripheral annular surfaces and the socket or recess surfaces further serves to minimize wear on the rope. In prior art designs with either sharp or beveled corners, considerable wear of the wire rope occurred as segments thereof spanned a recess and engaged the sharp corners of the recess which is eliminated in the present invention by the use of a nylon-coated rope and rounded corners on the recesses of the sprockets.

In the manufacture of the conveyor as described, the bearing housings may be cast and machined, the other components of the housing assemblies may be fabricated utilizing conventional processes and the unit may be readily assembled to provide the finished conveyor. The tubular members may consist of standard available tubing of desired diameter, cut to desired lengths. The tubing may be formed of an aluminum alloy, mild steel or stainless steel. The rope may be formed with the use of commercially available nylon-coated steel wire. In forming the rope assembly, the rope is cut to the desired length, and the intermediate disc assemblies are formed by mounting a boss, press-fitting an intermediate ferrule onto the nylon coating of the rope, mounting a disc element and then securing the boss and disc together with the intermediate ferrule therebetween. The ends of the rope assembly are then prepared for installation in a unit by mounting a boss on a trailing free end of the rope, mounting a disc element on the leading free end of the rope and then press-fitting and welding end ferrules on the base end portions of the rope. The assembly is then in condition to be inserted into the unit so that the free ends may be spliced together as previously described to complete the closed loop.

In assembling the conveyor, the lower housing is first mounted on the base unit with the lower sprocket shaft being connected to the drive motor and the hopper removed. The tubing is then connected to the lower housing assembly by means of clamps 45 and 46. The tubing is maintained in spaced apart relation by means of a pair of upper and lower tube clamps 118 and 119.

With the tubes thus mounted, the upper housing assembly with cover plate 87 removed is mounted on the upper ends of the tubes and secured thereto by clamps 94 and 95. The conveyor is then prepared to receive the rope assembly. The unspliced rope assembly is then fed into the conveyor through the upper housing assembly so that an intermediate portion is reeved about the upper sprocket and the end segments extend down through tube members 34 and 35 into the lower housing assembly. The end disc assembly is then accessed through the opening in the lower housing assembly and secured together in the manner as previously described so that the rope assembly will be reeved about the upper and lower sprockets with disc assemblies received in the sprocket recesses and the rope assembly being disposed along the circuitous path provided by the upper and lower housing assemblies and the interconnecting tubular members. The hopper may then be mounted on the lower housing assembly and the cover plate may be mounted on the upper housing assembly to complete the assembly of the unit.

In operation, the drive motor of the unit is first energized to drive the lower sprocket and correspondingly drive the rope assembly along the circuitous path at a speed in the range of 700 to 750 ft/min. The material to be conveyed is then gravity fed into the hopper which guides it to the lower end of the sprocket housing where it is picked up and transported by the disc assemblies of the rope assembly. The high speed of the rope assembly causes both air and material to be displaced thus enhancing the conveying process. Material reaching the upper end of the unit is caused to be propelled by a centrifugal force through upper housing portion 96 and be discharged through spout 97. The feed rate into the lower housing assembly may be regulated by adjusting the height of baffle plate 69. In applications where the material being conveyed has poor flow properties, hopper 71 may be used to fluidize the material fed into the hopper and deposited on the lower sloped guide wall thereof.

Although the embodiment as described is provided with a lower housing assembly having material feeding means, an upper housing assembly having material discharging means and a pair of straight tubular members interconnecting the upper and lower housing assemblies, it is to be understood that there can be a number of variations of such configuration within the scope of the invention. The unit may vary by providing two end housing assemblies and one or more intermediate housing assemblies provided with sprockets for guiding or driving the rope assembly, the tubular members may be straight or bent, the material feeding means may be located in either end housing assembly, the material discharging means can be located at any housing assembly or at one or more locations along the interconnecting tubing, and the housing assemblies can be located at any desired locations relative to each other.

In applications where fine or super fine products such as titanium oxide are to be conveyed, a lower sprocket housing as shown in FIGS. 9 through 12, and an upper sprocket housing section as shown in FIGS. 13 through 16 may be used in the embodiment as described to prevent the material from clinging to the interior housing surfaces and thus impeding or obstructing the transportation of the product. The use of such components enhances the flow of material by injecting air under pressure through boundary walls along the path of the rope assembly traveling at high speeds.

Referring to FIGS. 9 through 12, the lower sprocket housing 120 includes a pair of spaced annular side plates 121 and 122 providing access openings 123 and 124. Mounted between the lower portion of side plates 121 and 122 is an inner housing member 125 having a pair of arcuate side walls 126 and 127 secured to the inner sides of side plates 121 and 122 and a an interconnecting bottom wall 128 disposed concentrically relative to side plates 121 and 122. Housing member 125 is formed of the same dense screen material as bottom wall member 77 of previously described feed hopper 71. Also mounted on side plates 121 and 122 is an outer housing member 129 having a pair of side walls 130 and 131 secured to the outer sides of side plates 121 and 122 and a semi-circular bottom wall 132 spaced from inner housing wall 128 and disposed concentrically relative to plates 121 and 122. Permeable housing member 125 and solid housing member 129 cooperate with a set of solid end walls 133 and 134 to provide an arcuate chamber 134 which may be pressurized by means of a set of fixtures 135.

Figure 2:
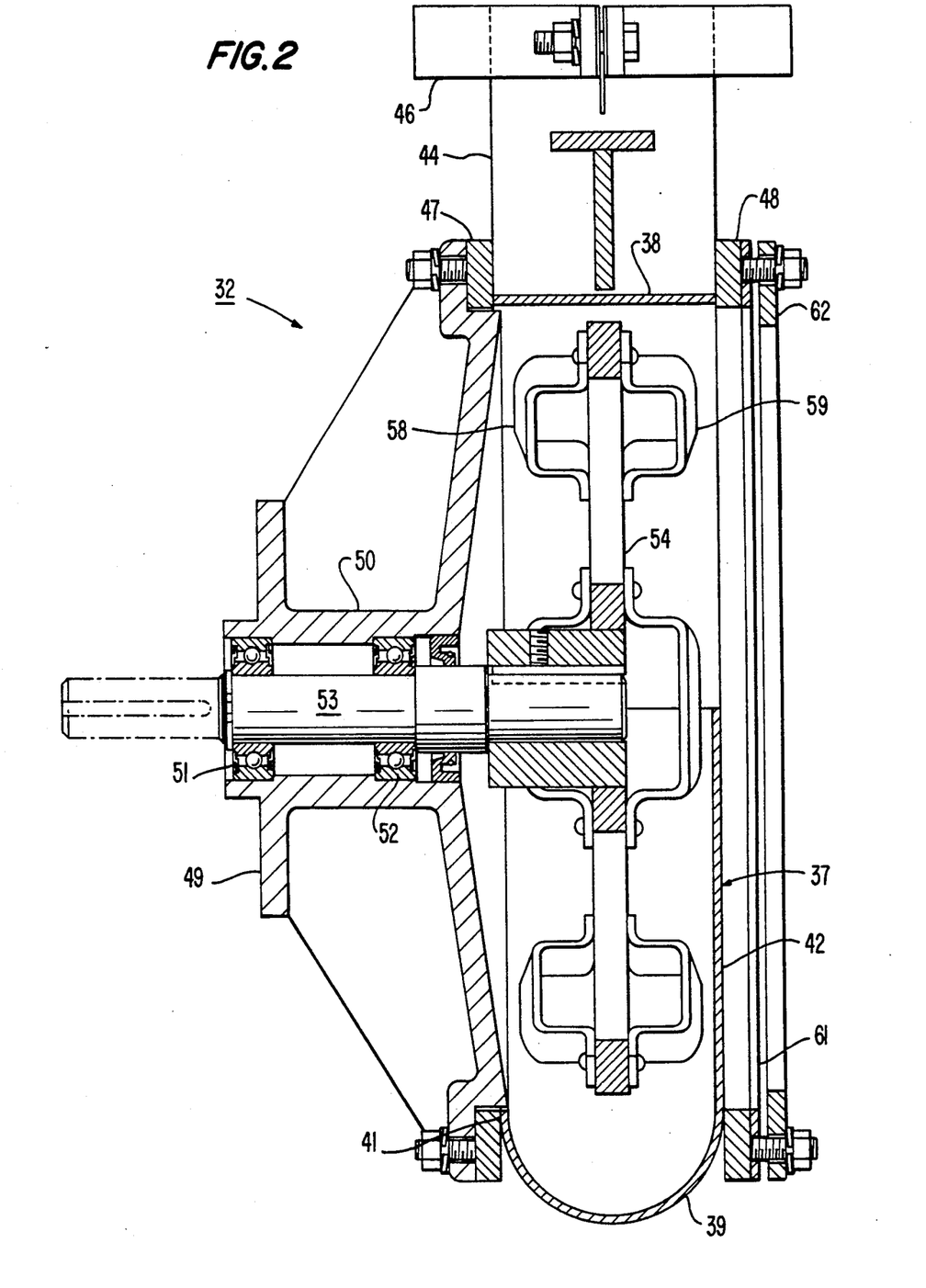
FIG. 2 is an enlarged cross-sectional view taken along line 2—2 in FIG. 1.

The upper end of housing 120 is provided with a pair of tubular sections 136 and 137 disposed substantially tangentially relative to inner housing wall 128, and an upper wall 138. Tubular sections 136 and 137 are comparable to tubular sections 43 and 44 of sprocket housing 37 and similarly are provided with a pair of clamps 139 and 140 for securing housing 120 to a pair of tubular members such as tubular members 34 and 35. A bearing housing and sprocket assembly as shown in FIG. 2 is mounted on one side of the housing and a hopper unit as shown in FIGS. 5 or 7 is mounted on the opposite side of the housing. A rope assembly as previously described also would be disposed in a segment of a circuitous path including tubular sections 136 and 137 and the lower portion of housing 120 along inner housing wall 128. It will be appreciated that when fittings 135 are connected to a source of air pressure, chamber 134 will be pressurized and air under pressure will be injected through permeable inner housing wall 128 to fluidize product entering the housing and engaged by the disc elements of the rope assembly to further prevent the material from clinging to any interior surfaces of the lower sprocket housing.

Figures 13, 16:
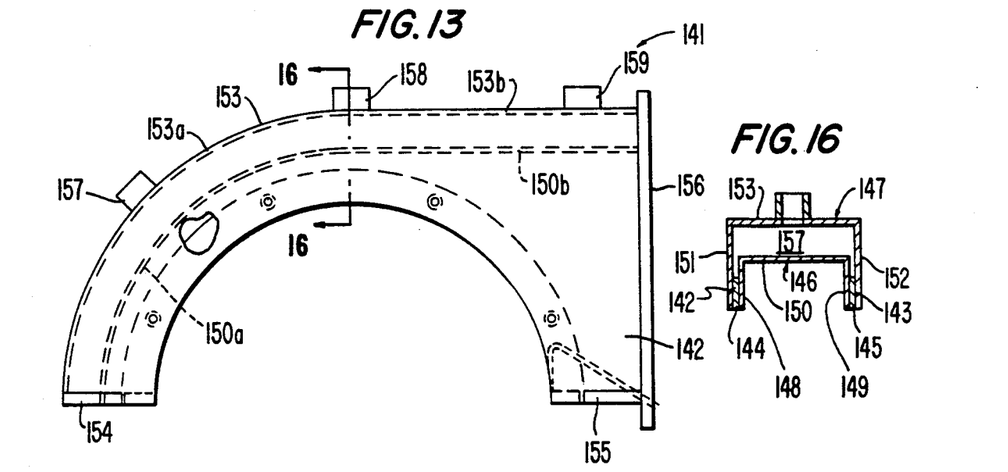
FIG. 13 is an enlarged, side elevational view of an intermediate housing assembly that may be utilized in the conveyor shown in FIG. 1.
FIG. 16 is a cross-sectional view taken along line 16—16 in FIG. 13.
Figure 14:
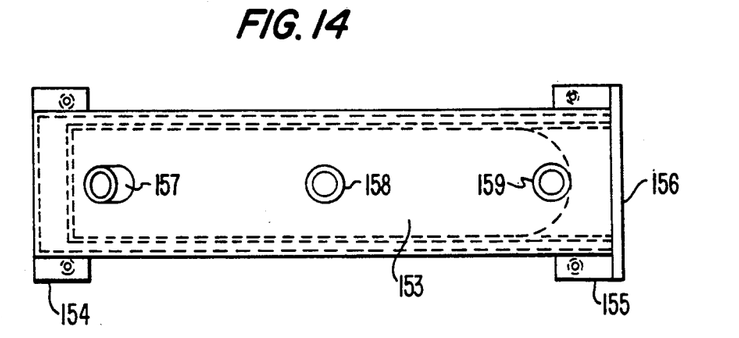
FIG. 14 is a top plan view of the assembly shown in FIG. 13.
Figure 15:
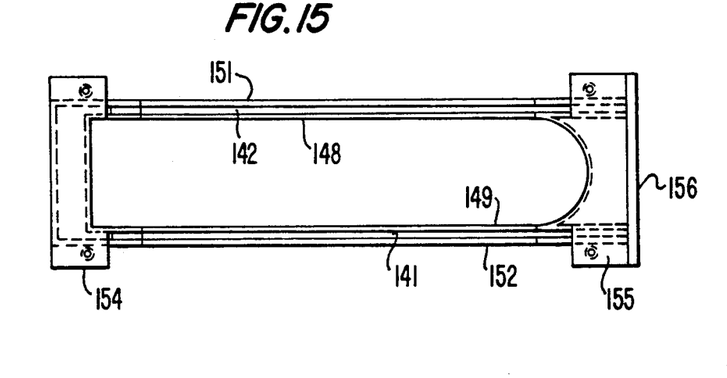
FIG. 15 is bottom plan view of the assembly shown in FIG. 13.

In conveying fine or super fine material the upper section of upper sprocket housing 84 also may be replaced with an upper housing section 141 as shown in FIGS. 13 through 16 to prevent clinging and further enhance the conveying process. The section includes a pair of arcuate side plates 142 and 143 provided with semi-circular openings 144 and 145, an inner housing member 146 and an outer housing member 147. Inner housing member 146 consists of a dense screen material as previously described and includes a pair of side walls 148 and 149 secured to the inner sides of intermediate plates 142 and 143 and an interconnecting wall section 150. As best shown in FIG. 13, wall section 150 includes an arcuate portion 150a and a tangential portion 150b. Outer housing member 147 consists of a solid material and includes a pair of side wall sections 151 and 152 secured to the outer sides of intermediate plates 142 and 143 and an interconnecting wall section 153. As shown in FIG. 13, wall section 153 includes an arcuate portion 153a and a tangential portion 153b which are disposed substantially parallel to wall portions 150a and 150b.

Secured to the lower ends of side walls 151 and 152 is a set of mounting plates 154 and 155 for mounting and securing housing section 141 to lower section 84b. Side walls 151 and 152 also are provided with an end plate 156 for mounting a discharge spout thereon comparable to spout 97 shown in FIG. 1. As best shown in FIGS. 13 and 16, side walls 142 and 143, permeable housing member 146, solid housing member 147 and end plates 154 and 156 define a chamber 157 which may be pressurized through fittings 157, 158 and 159 to cause air under pressure to be injected through permeable housing member 146 to fluidize the inner surfaces of member 146 and thus prevent material being conveyed by the rope assembly from clinging to interior surfaces of the upper sprocket housing. As in the upper sprocket housing shown in FIG. 3, a bearing housing with a sprocket attached is mounted on one side of housing section 141 and a cover plate is provided on the other side thereof, and a spout is mounted on end plate 156 to complete the upper housing assembly.

FIGS. 17 through 20 illustrate a sprocket housing 160 which may be utilized in a conveyor utilizing a lower sprocket housing as shown in FIGS. 9 through 12, an upper sprocket housing as shown in FIGS. 13 through 16, and two sets of tubular members for making a right angle turn in the circuitous path of the conveyor. In such a conveyor, a single lower sprocket housing, a pair of intermediate sprocket housings 160 and a single upper sprocket housing would be used. Of the first set of tubular members, one of the members would interconnect the lower sprocket housing and one of the intermediate sprocket housings to provide an advancing segment of the circuitous path and the other member would interconnect the other of the intermediate sprocket housings and the lower sprocket housing to provide a return segment of the circuitous path. Of the second set of tubular members, one member would interconnect the first of the intermediate sprocket housings and the upper sprocket housing to provide an advancing segment of the circuitous path, and the other member would interconnect the upper sprocket housing and the second of the intermediate sprocket housings to provide a return segment of the circuitous path.

Figures 17, 18, 19, 20:
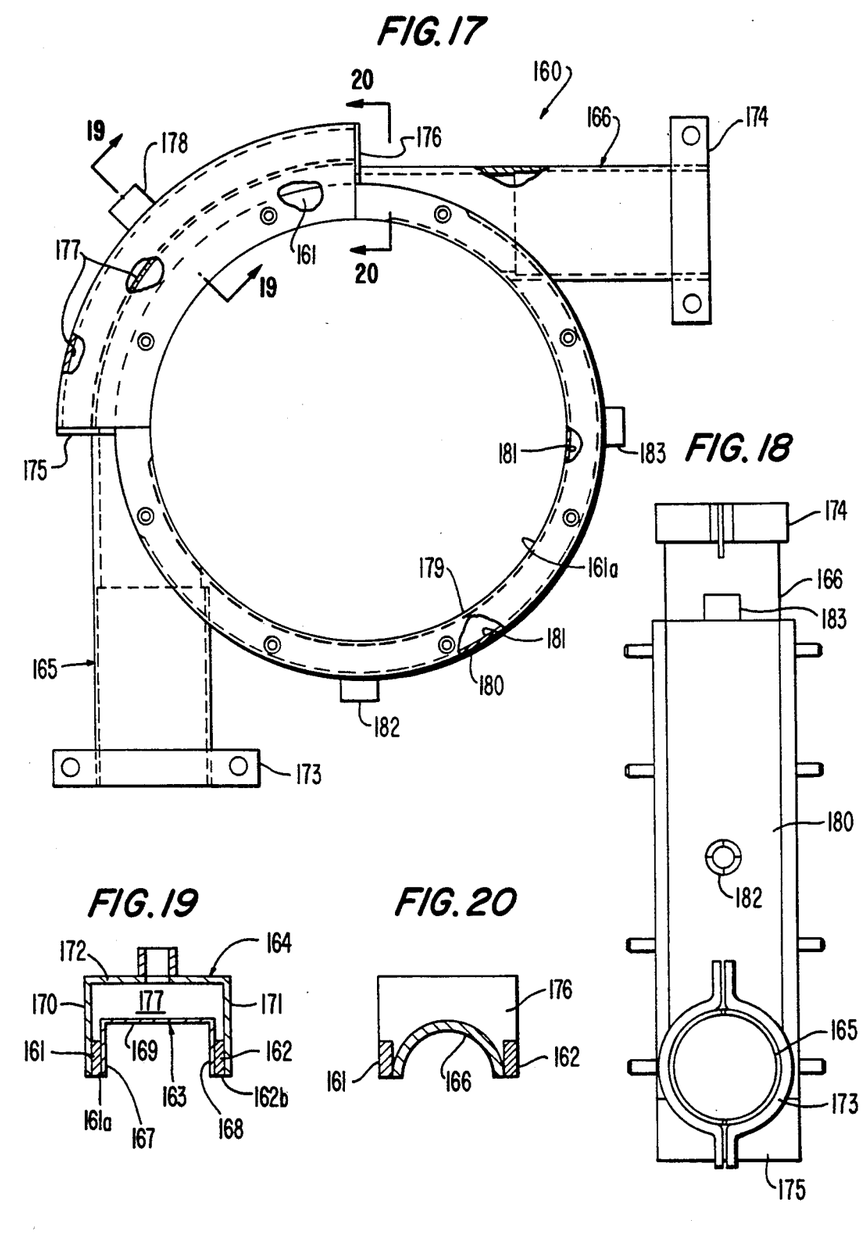
FIG. 17 is an enlarged, side elevational view of an alternate upper housing assembly that may be utilized in the conveyor shown in FIG. 1.
FIG. 18 is a bottom plan view of the housing assembly shown in FIG. 17.
FIG. 19 is a cross-sectional view taken along line 19—19 in FIG. 17.
FIG. 20 is a cross-sectional view taken along line 20—20 in FIG. 17.

Intermediate sprocket housing 160 includes a set of intermediate side plates 161 and 162, an inner housing member 163, an outer housing member 164 and a pair of conduit sections 165 and 166. Side plates 161 and 162 have annular configurations providing access openings 161a and 162b. Inner housing member 163 consists of a dense screen material of the type previously described and includes a pair of side wall sections 167 and 168 secured to the inner sides of side plates 161 and 162, and an interconnecting wall section 169. As best shown in FIG. 17, wall section 169 is arcuate and extends 90° relative to side plates 161 and 162. Outer housing member 164 consists of a solid material and includes a pair of side wall sections 170 and 171 secured to the outer sides of side plates 161 and 162, and an interconnecting wall section 172. Wall section 172 also is arcuate and extends 90° relative to side plates 161 and 162. Tubular sections 165 and 166 are secured to the inner sides of side plates 161 and 162 and are disposed tangentially relative to wall section 169, 90° apart relative to each other. The end portions similarly are provided with clamps 173 and 174 for securing a set of tubular members to sprocket housing 160.

Sprocket housing 160 further is provided with a set of end plates 175 and 176 which cooperate with inner and outer housing members 163 and 164 to provide an arcuate chamber 177 which may be pressurized by means of a suitable fixture 178. It will be appreciated that by pressurizing chamber 177, air under pressure will be caused to be injected through permeable housing member 163 to fluidize the inner surfaces thereof and prevent material being conveyed from clinging to the interior surfaces of the housing.

Disposed between tubular sections 165 and 166 is a pair of spaced, arcuate inner and outer wall members 179 and 180 which cooperate with a pair of end walls to provide an arcuate chamber 181. The inner wall member is formed of a permeable material of the type previously described and the outer wall member is formed of a solid material so that upon pressurizing chamber 181 through a set of fixtures 182 and 183, air under pressure will be injected through the permeable inner wall member to further prevent material being conveyed from lodging on the other interim surfaces of the housings.

In the use of a conveyor utilizing a lower sprocket housing 120, a feed hopper 71, one or more sets of intermediate socket housings 160, an upper sprocket housing section 141 and interconnecting tubular members, it further will be appreciated that the fluidization of the material being conveyed by the rope assembly as a result of the injection of air under pressure into the hopper and the several sprocket housings will prevent the clinging of fine and super fine products being conveyed thus permitting the rope assembly to run unimpeded at maximum speed and with minimum horsepower.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A conveyor for bulk materials comprising:
 a first housing;
 a second housing;
 a pair of conduits interconnecting said first and second housings to provide a circuitous path;
 one of said housings and said conduits having means for feeding material therein;
 one of said housings and said conduits having means for discharging material therefrom;
 a sprocket mounted on a shaft journaled in each of said housings;
 means for driving one of said sprockets; and
 a rope assembly including a nylon-coated metallic wire rope disposed in said housings and said conduits, along said circuitous path, and reeved around said sprockets, metallic end ferrules press-fit on and welded to opposing, exposed end portions of said rope, a plurality of intermediate metallic ferrules press-fit onto the nylon coating of said rope at spaced intervals between said end ferrules, and a plurality of disc assemblies mounted on said rope and received within spaced recesses provided on the peripheries of said sprockets, one of said disc assemblies including a single boss mounted on said rope and engaging one of said end ferrules, a single disc mounted on said rope and engaging the other of said end ferrules and means for securing said boss and disc together to secure said end ferrules therebetween, and each of the other of said disc assemblies including a single boss mounted on said rope and engaging an intermediate ferrule, a single disc mounted on said rope and engaging an intermediate ferrule and means for securing said last mentioned boss and disc together to secure said intermediate ferrule therebetween.

2. A conveyor according to claim 1 wherein at least one component of each disc assembly is formed of nylon.

3. A conveyor according to claim 1 wherein at least one component of each disc assembly is formed of polyurethane.

4. A conveyor according to claim 1 wherein at least one component of each of said disc assemblies is formed of polycarbonate.

5. A conveyor according to claim 1 wherein each of said sprockets has an annular surface about which said rope is reeved, said annular surface has a plurality of circumferentially spaced recesses adapted to receive said disc assemblies as the rope passes around said sprocket, and the corners defined by each of said recesses and said annular surface are rounded to eliminate sharp edges engageable by a segment of said rope spanning said recess.

6. A conveyor according to claim 1 wherein said means for feeding material into one of said housings comprises a hopper having a sloped bottom wall formed of a gas permeable material, and including means for injecting a gas under pressure through said gas permeable wall to fluidize material charged into said hopper and deposited on said bottom wall.

7. A conveyor according to claim 6 wherein said sloped bottom wall is formed of a dense screen material.

8. A conveyor according to claim 6 including means cooperating with said sloped bottom wall defining a closed chamber and means for supplying a gas under pressure to said chamber.

9. A conveyor according to claim 6 wherein said hopper is provided with an air vent.

10. A conveyor according to claim 1 including third and fourth housings, a first set of conduits interconnecting said first housing with said third and fourth housings and a second set of conduits interconnecting said second housing with said third and fourth housings to provide said circuitous path, and a sprocket mounted on a shaft journaled in each of said third and fourth housings, and wherein said rope assembly is reeved about the sprockets in said third and fourth housings.

11. A conveyor for bulk materials comprising:
 a first housing;
 a second housing;
 a pair of conduits interconnecting said first and second housings to provide a circuitous path;
 one of said housings and said conduits having means for feeding material therein;
 one of said housings and said conduits having means for discharging material therefrom;
 a sprocket mounted on a shaft journaled in each of said housings;
 means for driving one of said sprockets; and
 a rope assembly provided with disc assemblies spaced along the length thereof disposed along said circuitous path and reeved about said sprockets whereby materials fed into said first housing will be conveyed along a segment of said circuitous path by said disc assemblies and discharged through said material discharging means;
 at least one of said housings having a gas permeable wall disposed along said circuitous path; and means for injecting a gas under pressure through said gas permeable wall to enhance the flow characteristics of the material being conveyed therein.

12. A conveyor according to claim 11 wherein said gas permeable wall is formed of a dense screen material.

13. A conveyor according to claim 11 wherein at least one of said housings includes means cooperating with said gas permeable wall defining a chamber and means for supplying a gas under pressure to said chamber.

14. A conveyor according to claim 11 wherein said means for feeding material into one of said housings comprises a hopper having a sloped bottom wall formed of a gas permeable material and including means for injecting a gas under pressure through said gas permeable wall to fluidize material charged into said hopper and deposited on said bottom wall.

15. A conveyor according to claim 11 wherein said rope assembly includes a nylon-coated metallic wire rope disposed in said housings and said conduits, metallic end ferrules press-fit on and welded to opposing, exposed end portions of said rope, a plurality of intermediate metallic ferrules press-fit onto the nylon coating of said rope at spaced intervals between said end ferrules, and a plurality of disc assemblies mounted on said rope and received within spaced recesses provided in the peripheries of said sprockets, one of said disc assemblies including a single boss mounted on said rope and engaging one of said end ferrules, a single disc mounted on said rope and engaging the other of said end ferrules and means for securing said boss and disc together to secure said end ferrules therebetween, and each of the other of said disc assemblies including a single boss mounted on said rope and engaging an intermediate ferrule, a single disc mounted on said rope and engaging an intermediate ferrule and means for securing said last mentioned boss and disc together to secure said intermediate ferrule therebetween.

16. A conveyor according to claim 11 wherein each of said sprockets has an annular surface about which said rope is reeved, said annular surface has a plurality of circumferentially spaced recesses adapted to receive said disc assemblies as the rope passes around said sprocket and the corners defined by each of said recesses and said annular surface are rounded to eliminate any sharp edges engageable by a segment of said rope spanning said recess.

17. A conveyor according to claim 11 including third and fourth housings, a first set of conduit members interconnecting said first housing with said third and fourth housings and a second set of conduits interconnecting said second housing with said third and fourth housings to provide said circuitous path, and a sprocket mounted on a shaft journaled in each of said third and fourth housings, and wherein said rope assembly is reeved about the sprockets of said third and fourth housings.

18. A conveyor according to claim 17 wherein each of said housings includes a gas permeable wall disposed along said circuitous path, and means for injecting a gas under pressure through said gas permeable wall to enhance the flow characteristics of material being conveyed therein.

19. A conveyor according to claim 17 wherein said housing having said gas permeable wall includes means cooperating with said gas permeable wall defining a chamber and means for supplying a gas under pressure to said chamber.

20. A conveyor according to claim 17 wherein said means for feeding material into one of said housings comprises a hopper having a sloped bottom wall formed of a gas permeable material and including means for injecting a gas under pressure through said gas permeable wall to fluidize material charged into said hopper and deposited on said bottom wall.

21. A conveyor according to claim 7, wherein said dense screen material is a sintered and annealed metallic material produced by precision calendering and high temperature diffusion bonding to achieve precise and uniform air permeability.

22. A conveyor according to claim 12, wherein said dense screen material is a sintered and annealed metallic material produced by precision calendering and high temperature diffusion bonding to achieve precise and uniform air permeability.

* * * * *